United States Patent
Xu et al.

(10) Patent No.: US 11,498,554 B2
(45) Date of Patent: Nov. 15, 2022

(54) ENHANCED OBJECT DETECTION AND RESPONSE

(71) Applicant: Ford Global Technologies, LLC, Dearborn, MI (US)

(72) Inventors: Li Xu, Northville, MI (US); Douglas Blue, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 16/800,051

(22) Filed: Feb. 25, 2020

(65) Prior Publication Data
US 2021/0261118 A1 Aug. 26, 2021

(51) Int. Cl.
*B60W 30/09* (2012.01)
*B60W 10/20* (2006.01)
*G06V 20/58* (2022.01)

(52) U.S. Cl.
CPC ............ *B60W 30/09* (2013.01); *B60W 10/20* (2013.01); *G06V 20/58* (2022.01); *B60W 2710/20* (2013.01)

(58) Field of Classification Search
CPC .. B60W 30/09; B60W 10/20; B60W 2710/20; B60W 2520/10; B60W 10/18; B60W 2520/06; B60W 30/095; B60W 2554/402; B60W 2554/4026; B60W 2554/4029; G06V 20/58
See application file for complete search history.

(56) References Cited

U.S. PATENT DOCUMENTS

| 8,924,140 | B2 | 12/2014 | Sakamoto et al. |
| 9,145,286 | B2 | 9/2015 | Pfaff et al. |
| 2013/0124041 | A1 | 5/2013 | Belser et al. |
| 2017/0369054 | A1* | 12/2017 | Nishimura .......... B60W 30/095 |
| 2018/0162392 | A1* | 6/2018 | Takaki .................. G01S 13/867 |

FOREIGN PATENT DOCUMENTS

WO 2019042296 A1 3/2019

OTHER PUBLICATIONS

Brannstrom, M. et al., "Threat assessment for avoiding collisions with turning vehicles," Department of Vehicle Dynamics and Active Safety, Volvo Car Corporation; Department of Signals and Systems, Chalmers University of Technology, 2019, 6 pages.

* cited by examiner

*Primary Examiner* — Sze-Hon Kong
*Assistant Examiner* — Ana D Thomas
(74) *Attorney, Agent, or Firm* — Frank A MacKenzie; Bejin Bieneman PLC (57) ABSTRACT

A computer is programmed to identify a turning center defined by a turning radius of the vehicle and a heading angle of the vehicle, identify a boundary circle having a center defined by the turning center and a radius extending to a location of a detected object, identify coordinates for each of a plurality of vertices of an external contour of the vehicle, the external contour defining a plurality of line segments, each line segment connecting two of the vertices, upon identifying at least one line segment that intersects the boundary circle, identify at least one of an object distance or an intersection time between the object and the vehicle, and actuate at least one of a steering or a brake to avoid the object when the object distance is below a distance threshold or the intersection time is below a time threshold.

20 Claims, 5 Drawing Sheets

ENHANCED OBJECT DETECTION AND RESPONSE

BACKGROUND

A vehicle can use sensors to detect an object on a roadway. These sensors can detect an object position and speed relative to the vehicle. For example, the sensors can detect the position of the object relative to the vehicle when the vehicle is in a turn. The vehicle can respond to detecting the object, e.g., by steering away the object, by braking prior to reaching the object, etc.

DETAILED DESCRIPTION

A system includes a computer including a processor and a memory, the memory storing instructions executable by the processor to identify a turning center for a vehicle defined by a turning radius of the vehicle and a heading angle of the vehicle, identify a boundary circle having a center defined by the turning center and a radius extending to a location of a detected object, and identify coordinates for each of a plurality of vertices of an external contour of the vehicle. The external contour defines a plurality of line segments, each line segment connecting two of the vertices. The instructions include instructions to determine whether the boundary circle intersects each line segment, and, upon identifying at least one line segment that intersects the boundary circle, identify at least one of an object distance or an intersection time between the object and the vehicle. The instructions include instructions to actuate at least one of a steering or a brake to avoid the object when the object distance is below a distance threshold or the intersection time is below a time threshold.

The instructions can further include instructions to identify an intersection point at a location where the boundary circle intersects one of the line segments and to determine the intersection time based on an angle between the location of the detected object and the intersection point.

The instructions can further include instructions to identify an intersection point at a location where the boundary circle intersects one of the line segments and to determine the object distance based on an angle between the location of the detected object and the intersection point.

The instructions can further include instructions to determine the intersection time based on a speed of the vehicle and the turning radius of the vehicle.

The instructions can further include instructions to identify an intersection point at a location where the boundary circle intersects one of the line segments and to determine an intersection heading angle of the vehicle at the intersection point.

The instructions can further include instructions to actuate the steering to steer away from the object based on the intersection heading angle.

The instructions can further include instructions to, upon actuating the steering to avoid the object, identify a new heading angle of the vehicle, to identify a new turning radius of the vehicle, and to identify a new turning center for the vehicle based on the new turning radius and the new heading angle.

The instructions can further include instructions to determine the turning radius of the vehicle based on one of a road wheel angle or a planned path of the vehicle.

The instructions can further include instructions to identify an intersection point at a location where the boundary circle intersects one of the line segments based on respective locations of the vertices between which the line segment extends.

The external contour can define a polygon, and each of the plurality of vertices defines a vertex of the polygon.

The instructions can further include instructions to provide a warning to an occupant of the vehicle when the object distance is below a distance threshold or the intersection time is below a time threshold.

The plurality of vertices can include at least five vertices.

A method includes identifying a turning center for a vehicle defined by a turning radius of the vehicle and a heading angle of the vehicle, identifying a boundary circle having a center defined by the turning center and a radius extending to a location of a detected object, and identifying coordinates for each of a plurality of vertices of an external contour of the vehicle. The external contour defining a plurality of line segments, each line segment connecting two of the vertices. The method includes determining whether the boundary circle intersects each line segment and, upon identifying at least one line segment that intersects the boundary circle, identifying at least one of an object distance or an intersection time between the object and the vehicle. The method includes actuating at least one of a steering or a brake to avoid the object when the object distance is below a distance threshold or the intersection time is below a time threshold.

The method can further include identifying an intersection point at a location where the boundary circle intersects one of the line segments and determining the intersection time based on an angle between the location of the detected object and the intersection point.

The method can further include identifying an intersection point at a location where the boundary circle intersects one of the line segments and determining the object distance based on an angle between the location of the detected object and the intersection point.

The method can further include determining the intersection time based on a speed of the vehicle and the turning radius of the vehicle.

The method can further include identifying an intersection point at a location where the boundary circle intersects one of the line segments and determining an intersection heading angle of the vehicle at the intersection point.

The method can further include actuating the steering to steer away from the object based on the intersection heading angle.

The method can further include, upon actuating the steering to avoid the object, identifying a new heading angle of the vehicle, identifying a new turning radius of the vehicle, and identifying a new turning center for the vehicle based on the new turning radius and the new heading angle.

The method can further include determining the turning radius of the vehicle based on one of a road wheel angle or a planned path of the vehicle.

The method can further include identifying an intersection point at a location where the boundary circle intersects one of the line segments based on respective locations of the vertices between which the line segment extends.

The method can further include providing a warning to an occupant of the vehicle when the object distance is below a distance threshold or the intersection time is below a time threshold.

A system includes a vehicle including a steering and a brake, means for identifying a turning center for the vehicle defined by a turning radius of the vehicle and a heading angle of the vehicle, means for identifying a boundary circle having a center defined by the turning center and a radius extending to a location of a detected object and means for identifying coordinates for each of a plurality of vertices of an external contour of the vehicle. The external contour defines a plurality of line segments, each line segment connecting two of the vertices. The system includes means for determining whether the boundary circle intersects each line segment and means for identifying at least one of an object distance or an intersection time between the object and the vehicle upon identifying at least one line segment that intersects the boundary circle. The system includes means for actuating at least one of the steering or the brake to avoid the object when the object distance is below a distance threshold or the intersection time is below a time threshold.

The system can further include means for identifying an intersection point at a location where the boundary circle intersects one of the line segments and means for determining the intersection time based on an angle between the location of the detected object and the intersection point.

The system can further include means for identifying an intersection point at a location where the boundary circle intersects one of the line segments and means for determining the object distance based on an angle between the location of the detected object and the intersection point.

The system can further include means for identifying an intersection point at a location where the boundary circle intersects one of the line segments and means for determining an intersection heading angle of the vehicle at the intersection point.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in a vehicle can detect an object while the vehicle is in a turn. The computer can identify a turning center about which the vehicle turns. The computer can predict a location of the object relative to the turning center as a boundary circle about the turning center. The computer can determine whether the boundary circle intersects an external contour of the vehicle. The external contour can be a polygon representing the external boundary of the vehicle in a vehicle coordinate system. Using the intersection between the boundary circle and the external contour allows the computer to predict a collision with the object using only the location of the object and the dynamics of the vehicle, reducing computations performed for object detection and response and improving accuracy of predicting the collision. That is, the computer can use a smaller amount of data for object detection and response than, e.g., image analysis in a neural network, which may require several cycles of collected data to predict a path of an object and actuate components to avoid the object.

Figure 1:
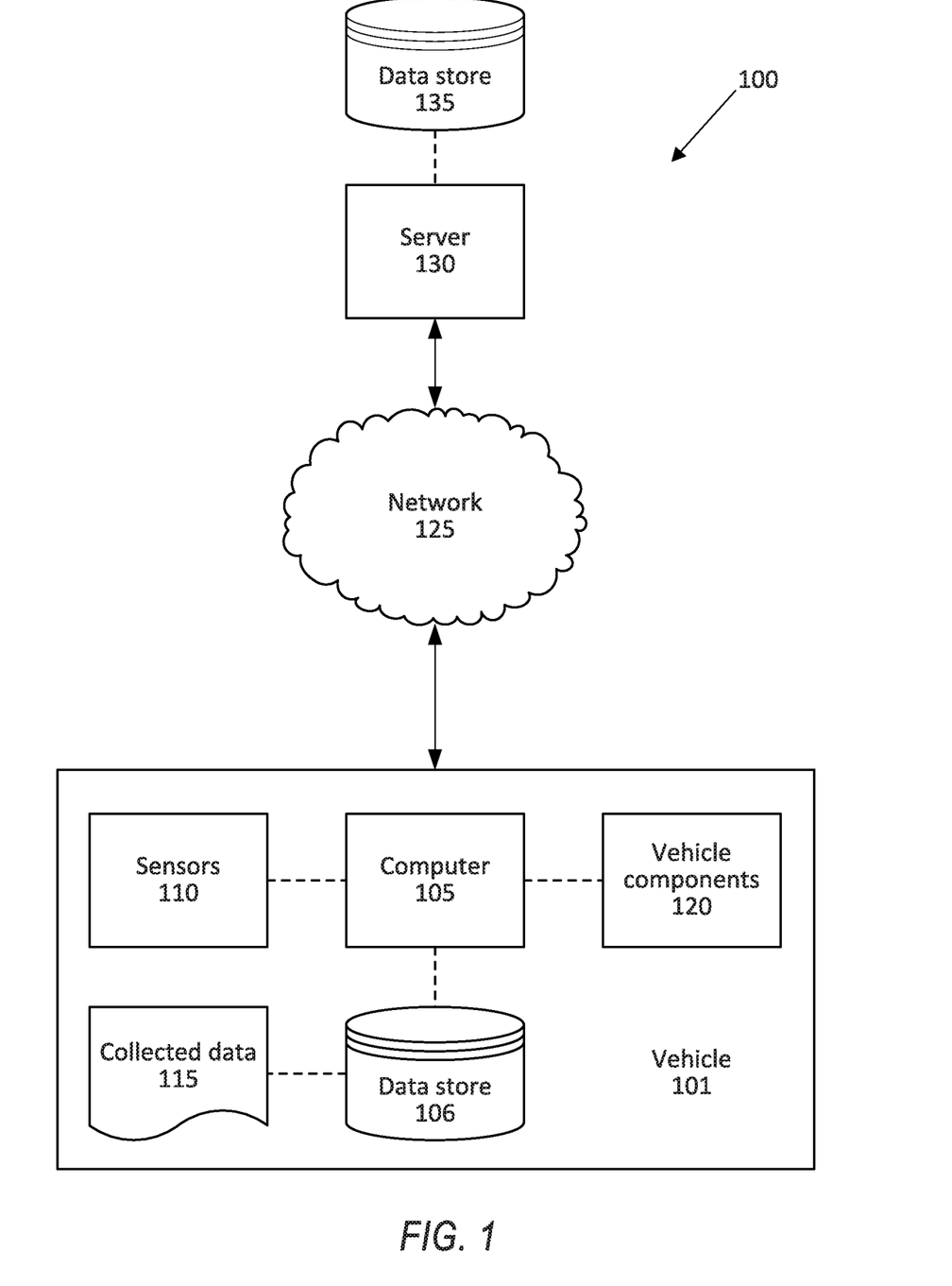
FIG. 1 is a block diagram of an example system for object detection.

FIG. 1 illustrates an example system 100 for object detection and response. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110. The data store 106 can be a separate device from the computer 105, and the computer 105 can retrieve information stored by the data store 106 via a network in the vehicle 101, e.g., over a CAN bus, a wireless network, etc. Alternatively or additionally, the data store 106 can be part of the computer 105, e.g., as a memory of the computer 105.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode, i.e., an "autonomous" operation mode. A fully autonomous mode is defined as one in which each of vehicle 101 propulsion (typically via a powertrain including an electric motor and/or internal combustion engine), braking, and steering are controlled by the computer 105. A semiautonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
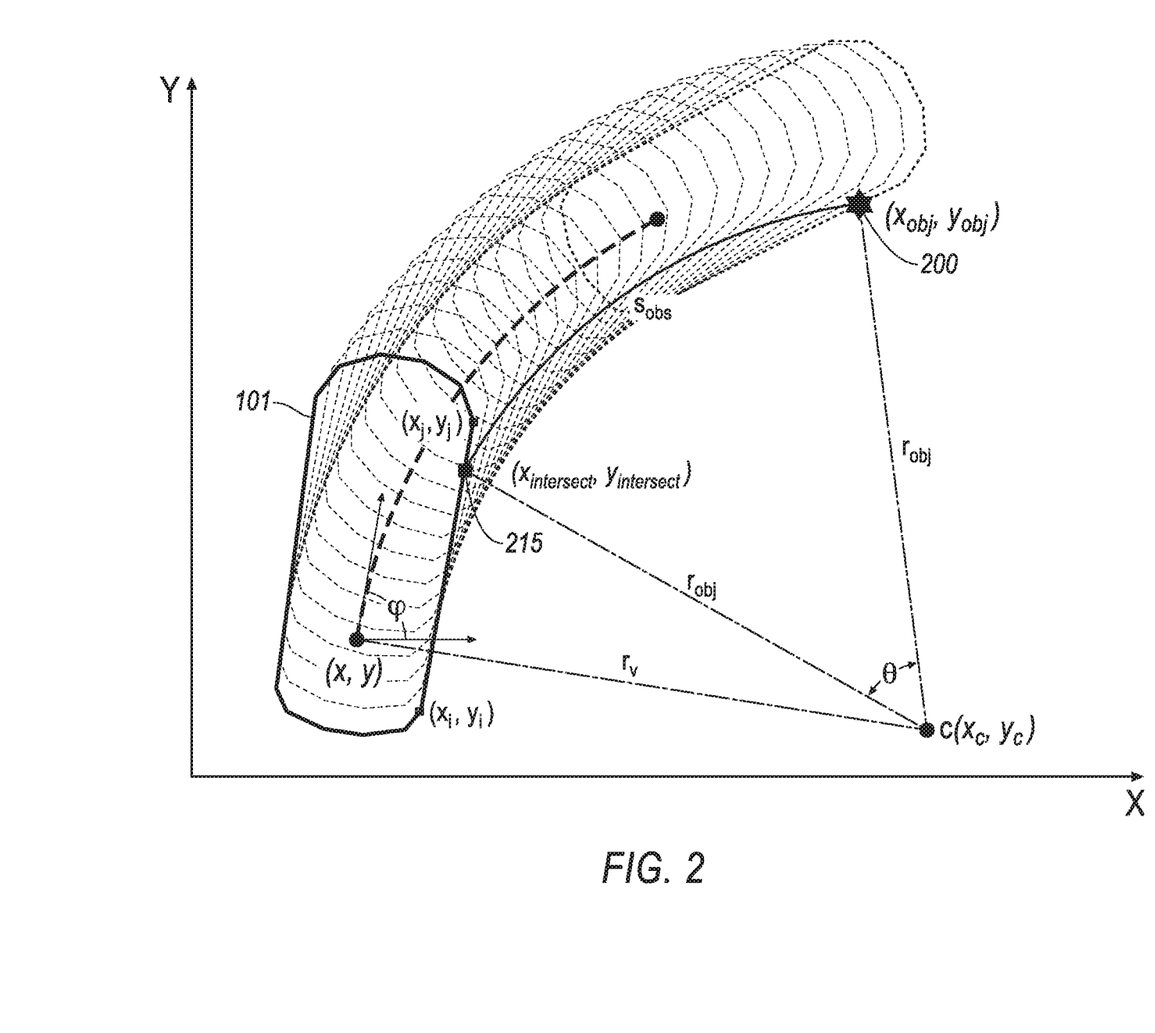
FIG. 2 is a plan view of an example vehicle and an example object.

FIG. 2 is a plan view of an example vehicle 101 and an example object 200 in a global coordinate system. In this context, the "global coordinate system" is a geo-location longitude and latitude coordinate system where coordinates are specified for the surface of the earth according to a fixed origin, i.e., an origin that does not change as an object moves and that does not depend on the location of any object with respect to the coordinate system, e.g., a Global Navigation Satellite System (GNSS) such as the Global Positioning System (GPS). The latitude coordinates, i.e., north-south, are represented with the "Y" axis. The longitude coordinates, i.e., east-west, are represented with the "X" axis. A "position" is a set of x, y coordinates represent a longitude and a latitude, respectively, in the global coordinate system. The vehicle 101 defines a heading angle φ that is an angle defined between a longitudinal axis $X_v$ of the vehicle 101, as described below and shown in FIG. 3, and the X axis of the global coordinate system. The object 200 can be, e.g., another vehicle 101, a pedestrian, a cyclist, etc. The object 200 has a position $x_{obj}$, $y_{obj}$.

Figure 3:
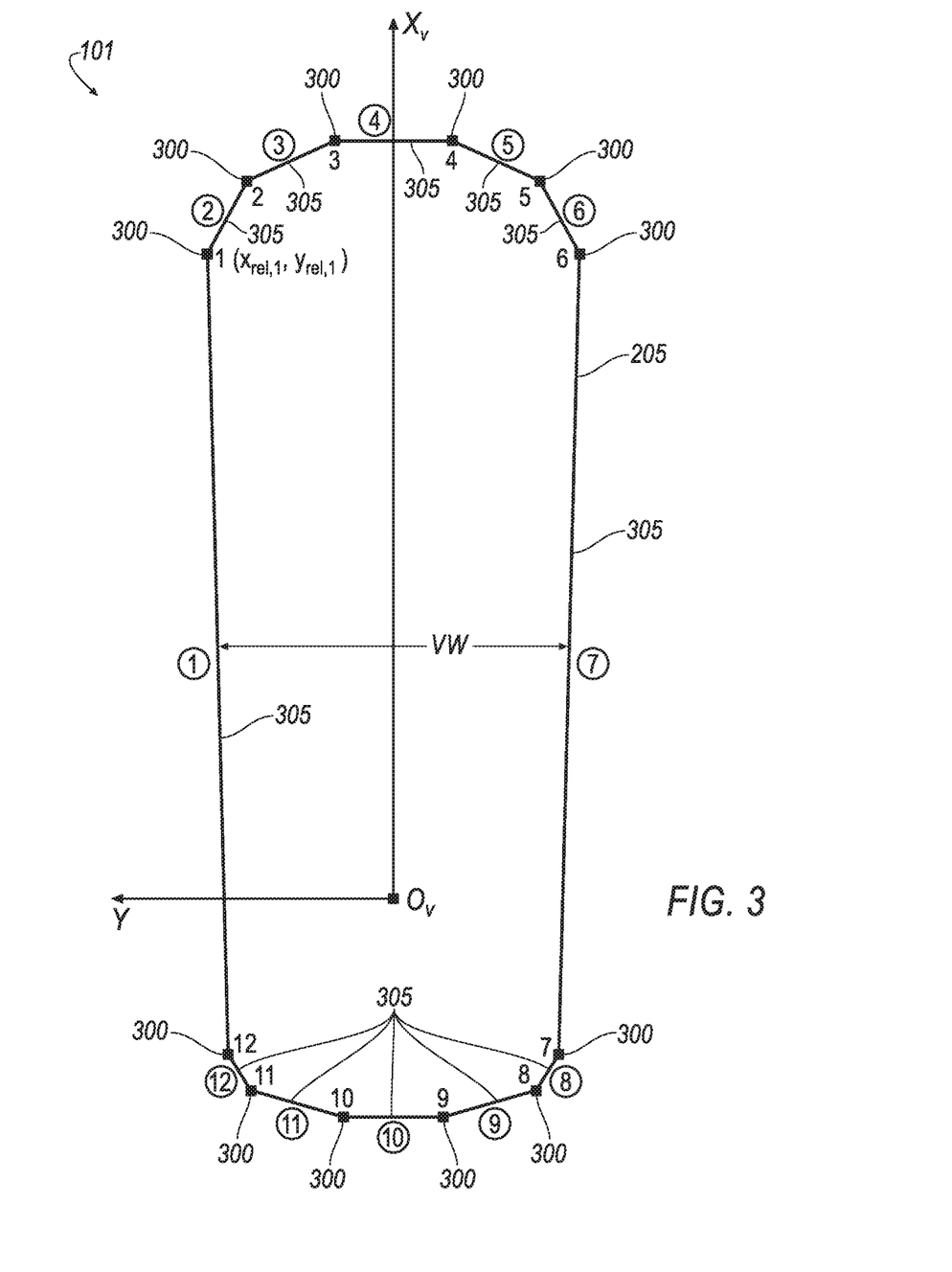
FIG. 3 is a plan view of an external contour of the example vehicle.

The computer 105 can collect data 115 in a local coordinate system, e.g., a vehicle coordinate system, as shown in FIG. 3. In this context, a "vehicle coordinate system" of the vehicle 101 is a two-dimensional coordinate system having an origin $O_v$ that is a point on and/or in the vehicle 101. In the example of FIG. 3, the origin $O_v$ is a center point of a rear axle of the vehicle 101. The origin can be a predetermined point on the vehicle 101 stored in the data store 106. The local coordinate system has a longitudinal axis $X_v$ and a lateral axis $Y_v$ extending from the origin $O_v$. The vehicle 101 has a width VW defined as the distance along the lateral axis $Y_v$ between one side of the vehicle 101 and the other side of the vehicle 101, as shown in FIG. 3.

The computer 105 can identify an external contour 205 of the vehicle 101. The external contour 205 is a shape enclosing a two-dimensional projection of the vehicle 101. For example, as shown in FIGS. 2-3, the external contour 205 is a shape enclosing the two-dimensional projection of the vehicle 101 onto the global coordinate system. The external contour 205 can be a polygon, i.e., a shape having a plurality of vertices and a plurality of line segments connecting adjacent vertices to form an enclosed loop as described below. The computer 105 can identify the polygon defining the external contour 205 based on a virtual model of the vehicle 101, e.g., a computer-aided design (CAD) diagram, a digital photograph, etc. The external contour 205 can be stored in the data store 106.

The computer 105 can identify a turning radius $r_v$ of the vehicle 101. A "turning radius" is a radius of a circle along which the vehicle 101 follows in a turn. That is, as the vehicle 101 turns, the path that the vehicle 101 follows defines an arc of a circle, and the turning radius is the radius of the circle:

$$r_v = \frac{WB}{\tan\delta} \tag{1}$$

where WB is the wheelbase of the vehicle 101, δ is the road wheel angle, and tan is the tangent trigonometric function. The "wheelbase" WB is the distance between an axis of rotation of front wheels of the vehicle 101 and an axis of rotation of rear wheels of the vehicle 101. The wheelbase WB can be stored in the data store 106. The "road wheel angle" δ is an angle defined between a front wheel of the vehicle 101 and an axis extending through the front wheel parallel to a longitudinal axis of the vehicle 101. A positive road wheel angle δ is defined as counterclockwise (i.e., turning left) and a negative road wheel angle δ is defined as clockwise (i.e., turning right). The computer 105 can determine the road wheel angle δ by measuring a steering wheel angle from data 115 from a steering wheel sensor 110 and multiplying the steering wheel angle by a steering ratio, i.e., the ratio of an angle change of the steering wheel to an angle change of the front wheel. The steering ratio can be stored in the data store 106.

Alternatively or additionally, the computer 105 can identify the turning radius $r_v$ based on a path planning algorithm. The path planning algorithm can identify a path along which the vehicle 101 follows. Alternatively, the computer 105 can identify the turning radius $r_v$ based on a curvature of a portion of the identified path p(x) that is a polynomial function, according to a conventional curvature technique:

$$r_v = \frac{(1+(p')^2)^{\frac{3}{2}}}{|p''|} \quad (2)$$

where p' is the first derivative of the path polynomial p(x) and p" is the second derivative of the path polynomial p(x). The path polynomial p(x) is a model that predicts the path as a line traced by a polynomial equation. The path polynomial p(x) predicts the path for a predetermined upcoming distance x, by determining a lateral coordinate y, e.g., measured in meters:

$$p(x)=a_0+a_1x+a_2x^2+a_3x^3 \quad (1)$$

where $a_0$ an offset, i.e., a lateral distance between the path and a center line of the vehicle 101 at the upcoming distance x, $a_1$ is a heading angle of the path, $a_2$ is the curvature of the path, and $a_3$ is the curvature rate of the path. In the present context, the "upcoming distance" x is a predetermined longitudinal distance in front of the vehicle 101 from a front bumper of the vehicle 101 at which the sensors 110 collect data 115 and the computer 105 predicts the path. The upcoming distance x can be determined based on, e.g., a current speed of the vehicle 101, a predetermined time threshold, determined based on empirical simulation data, a detection range of the sensors 110, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the vehicle path polynomial, where braking torque and powertrain torque are applied as positive and negative longitudinal accelerations and clockwise and counter clockwise steering torque are applied as left and right lateral accelerations.

The computer 105 can identify a turning center c from which the turning radius $r_v$ extends. The turning center c has coordinates $x_c$, $y_c$ in the global coordinate system. The computer 105 can determine a current position x, y and heading angle φ of the vehicle 101, as described above. The computer 105 can then identify the coordinates $x_c$, $y_c$ of the turning center c:

$$x_c = x - r_v \cos \varphi \quad (3)$$

$$y_c = y + r_v \sin \varphi \quad (4)$$

As the vehicle 101 turns, the external contour 205 rotates around the turning center c, shown in FIG. 2 as the broken-line contours toward the object 200. That is, the broken-line contours represent the path that the vehicle 101 would follow when turning about the turning center c.

Based on the turning center coordinates $x_c$, $y_c$ and the object coordinates $x_{obj}$, $y_{obj}$ of the detected object 200, the computer 105 can identify a distance $r_{obj}$ between the turning center c and the object 200:

$$r_{obj} = \sqrt{(x_c - x_{obj})^2 (y_c - y_{obj})^2} \quad (5)$$

The distance $r_{obj}$ defines a boundary circle 210 having a center at the turning center c and a radius $r_{obj}$ extending to the location of the object 200. The boundary circle 210 represents the position of the object 200 while the vehicle 101 is turning. That is, the position of the object 200 is represented by the boundary circle 210, and when the boundary circle 210 intersects the external contour 205, the object 200 is likely to collide with the vehicle 101. The computer 105 can determine that the vehicle 101 is likely to collide with the object with the external contour 205 intersects the boundary circle 210. The point at which the external contour 205 intersects the boundary circle 210 is an intersection point 215 having coordinates $x_{intersect}$, $y_{intersect}$. That is, the intersection point 215 has coordinates on the boundary circle 210:

$$r_{obj}^2 = (x_{intersect} - x_c)^2 + (y_{intersect} - y_c)^2 \quad (6)$$

The computer 105 can identify a plurality of line segments of the external contour 205, as shown in FIG. 3 and described in further detail below. That is, the external contour 205 defines a plurality of vertices 300. Each vertex 300 has a set of coordinates $x_{rel,i}$, $y_{rel,i}$ in the vehicle coordinate system, where i is a natural number between 1 and a total number n of vertices 300. In FIG. 3, each vertex 300 is represented with a number between 1 and 12, representing the twelve vertices 300 of the external contour 205. Alternatively, the external contour 205 can have a different number of vertices 300, e.g., five, eight, sixteen, etc. The coordinates $x_{rel,i}$, $y_{rel,i}$ are thus relative distances between the vertex 300 and the origin $O_v$. The computer 105 can identify global coordinates $x_i$, $y_i$ for each vertex 300:

$$x_i = x + x_{rel,i} \cos \varphi - y_{rel,i} \sin \varphi \quad (7)$$

$$y_i = y + x_{rel,i} \sin \varphi + y_{rel,i} \cos \varphi \quad (8)$$

The external contour 205 defines a plurality of line segments 305. The line segments 305 extend between adjacent pairs of vertices 300 to form a polygon, i.e., a closed plane figure with straight edges. In FIG. 3, each line segment 305 is represented with a number enclosed in a circle, the number being between 1 and 12 to represent the twelve line segments 305. The polygon can be a convex polygon, i.e., a polygon in which an angle defined between two adjacent line segments 305 is less than 180 degrees. The polygon can include at least five vertices 300, e.g., twelve vertices as shown in FIG. 3. Each line segment 305 is thus defined according to a Euclidean distance between a pair of vertices 300:

$$seg_i = \sqrt{(x_i - x_j)^2 + (y_i - y_j)^2} \quad (9)$$

where $seg_i$ is the line segment 305 and i, j are consecutive indexes between 1 and n.

When the external contour 205 intersects the boundary circle 210, the intersection point 215 coordinates $x_{intersect}$, $y_{intersect}$ coincide with coordinates of a point on the line segment 305:

$$x_{intersect} = x_j t + x_i (1-t) \quad (10)$$

$$y_{intersect} = y_j t + y_i (1-t) \quad (11)$$

where t is a dummy variable that indicates whether the boundary circle 210 intersects a location between the vertices 300 defining the line segment 305. That is, the computer 105 can identify the intersection point 215 as a location where the boundary circle 210 intersects one of the line segments 305 based on respective locations of the vertices 300 between which the line segment 305 extends. When the variable t is between 0 and 1, the coordinates $x_{intersect}$, $y_{intersect}$ lie on the line segment 305. When the variable t is less than 0, greater than 1, or complex, the coordinates $x_{intersect}$, $y_{intersect}$ do not lie on the line segment 305. When t is 0 or 1, the coordinates $x_{intersect}$, $y_{intersect}$ coincide with one of the vertices 300. Thus, points on the boundary circle 210 that generate values of t between 0 and 1 are boundary points 215.

Inserting this definition of the intersection point 215 coordinates $x_{intersect}$, $y_{intersect}$ into the equation for the boundary circle 210 generates a quadratic equation in the variable t:

$$r_{obj}^2 = ((x_f t + x_i(1-t)) - x_c)^2 + ((y_f t + y_i(1-t)) - y_c)^2 \qquad (12)$$

The computer 105 can solve the quadratic equation using, e.g., the quadratic formula, to find solutions for t. If the solutions for t are complex (i.e., including an imaginary part) or there is only one solution for t, the computer 105 can determine that the boundary circle 210 does not intersect the line segment 305 and no intersection point 215 exists. If there are two solutions for t, one or both of which are t≥1, t≤0, the computer 105 can determine that the boundary circle 210 does not intersect the line segment 305 and no intersection point 215 exists. If there are two solutions for t, at least one of which satisfies 0<t<1, the computer 105 can determine that the boundary circle 210 intersects the line segment 305 at the intersection point 215 defined by the value of t between 0 and 1. The computer 105 identify solutions for t for each line segment 305 to determine whether the boundary circle 210 intersects any of the line segments 305.

Upon identifying intersection points 215, the computer 105 can identify a center angle $\theta_i$ for one of the line segments 305 between lines extending from the turning center c to the intersection point 215 and the location of the object 200:

$$\theta_i = \cos^{-1}\left(\frac{(2r_{obj}^2 - (x_{intersect} - x_{obj})^2 - (y_{intersect} - y_{obj})^2)}{2r_{obj}^2}\right) \qquad (13)$$

The computer 105 can identify respective center angles $\theta_i$ for each line segment 305 based on the intersection points 215, if any of the line segment 305. The computer 105 can identify a minimum center angle θ to predict a collision with the object 200, as described below.

The computer 105 can identify an object distance $s_{obj} = r_{obj} \cdot \theta$ between the vehicle 101 and the object 200 based on the minimum center angle θ and the radius $r_{obj}$ of the boundary circle 210. Because the object distance $s_{obj}$ is based on the minimum center angle θ, the object distance $S_{obj}$ is the minimum distance between the object 200 and the vehicle 101. The computer 105 can identify an intersection heading angle $\varphi' = \varphi + \theta \cdot sign(\delta)$ that is the heading angle of the vehicle 101 upon reaching the intersection point 215. The sign(δ) adjustment to the heading angle $\varphi'$ accounts for the direction of the road wheel angle δ changing the intersection heading angle $\varphi'$.

Alternatively or additionally, the computer 105 can identify an intersection time $T_{intersect}$, i.e., a predicted time until the vehicle 101 reaches the intersection point 215:

$$T_{intersect} = \frac{\theta|r_v|}{V} \qquad (14)$$

where V is a current speed of the vehicle 101. Because the intersection time $T_{intersect}$ is based on the minimum center angle θ, the intersection time $T_{intersect}$ is the minimum time for the object 200 to reach the vehicle 101.

The computer 105 can compare the object distance $s_{obj}$ to a distance threshold. The distance threshold can be a minimum braking distance to stop the vehicle 101 prior to reaching the object 200. Alternatively or additionally, the distance threshold can be a minimum steering distance to steer the vehicle 101 away from the object 200. The distance threshold can be determined based on empirical testing of vehicles 101 applying brakes and steering at differing speeds and measuring a braking distance and a steering distance for each speed. Yet alternatively or additionally, the computer 105 can compare the intersection time $T_{intersection}$ to a time threshold. The time threshold can be a minimum braking time to stop the vehicle 101 prior to reaching the object 200. Alternatively or additionally, the time threshold can be a minimum steering time to steer the vehicle 101 away from the object 200. The time threshold can be determined based on empirical testing of vehicles 101 applying brakes and steering at differing speeds and measuring a braking time and a steering time for each speed.

Upon identifying the object distance $s_{obj}$ and/or the intersection time $T_{intersect}$, the computer 105 can actuate one or more components 120 to avoid the object 200. For example, to stop the vehicle 101 prior to reaching the object distance $s_{obj}$, the computer 105 can identify a deceleration a to stop the vehicle 101 before reaching the intersection point 215:

$$a = \frac{V^2}{2\theta|r_v|} \qquad (15)$$

Alternatively or additionally, the computer 105 can reduce a road wheel angle δ of the vehicle 101 to reduce the turning radius of the vehicle 101, avoiding the object 200. The computer 105 can actuate the steering component 120 to reduce the road wheel angle δ, steering the vehicle 101 away from the object 200. To reduce the road wheel angle δ, the computer 105 can identify a minimum turning radius $r_{min}$:

$$r_{min} = sign(r_v)\left(\frac{VW}{2} + r_{obj}\right) \qquad (16)$$

where sign( ) is the signum function (i.e., extracts the sign of real number $r_v$) and VW is the width of the vehicle 101, as described above. Upon determining the minimum turning radius $r_{min}$, the computer 105 can determine a feedforward road wheel angle $\delta_{ff}$ to reduce the road wheel angle:

$$\delta_{ff} = \tan^{-1}\frac{WB}{r_{min}} \qquad (17)$$

The computer 105 can input the feedforward road wheel angle $\delta_{ff}$ to a feedback controller, as described below, to identify a target road wheel angle δ.

The computer 105 can identify a steering wheel angle SW based on the intersection heading angle $\varphi'$, described above, to adjust the heading angle $\varphi$ to avoid the object 200. Upon actuating the steering component 120 to avoid the object 200, the computer 105 can identify a new heading angle $\varphi$, a new turning radius $r_v$, and a new turning center c for the vehicle 101 to determine a new boundary circle 210 for the object 200. Based on an intersection between the new boundary circle 210 and the external contour 205, the computer 105 can determine whether the vehicle 101 is likely to collide with the object 200. Upon identifying no intersection points 215 between the new boundary circle 210 and the external contour 205, the computer 105 can determine that the vehicle 101 is not likely to meet the object 200.

Additionally or alternatively, the computer 105 can provide one or more warnings to an occupant of the vehicle 101 when the object distance $s_{obj}$ is below a distance threshold and/or the intersection time $T_{intersect}$ is below a time threshold. The warnings can be e.g., audio, visual, haptic, etc. For example, the computer 105 can provide an audio warning through speakers in the vehicle 101. In another example, the computer 105 can provide a visual warning on a display screen in the vehicle. In yet another example, the computer 105 can provide a haptic warning on a steering wheel and/or a seat in the vehicle 101. Upon providing the warning, the computer 105 can receive operator input to the components 120 to avoid the object 200.

Figure 4:
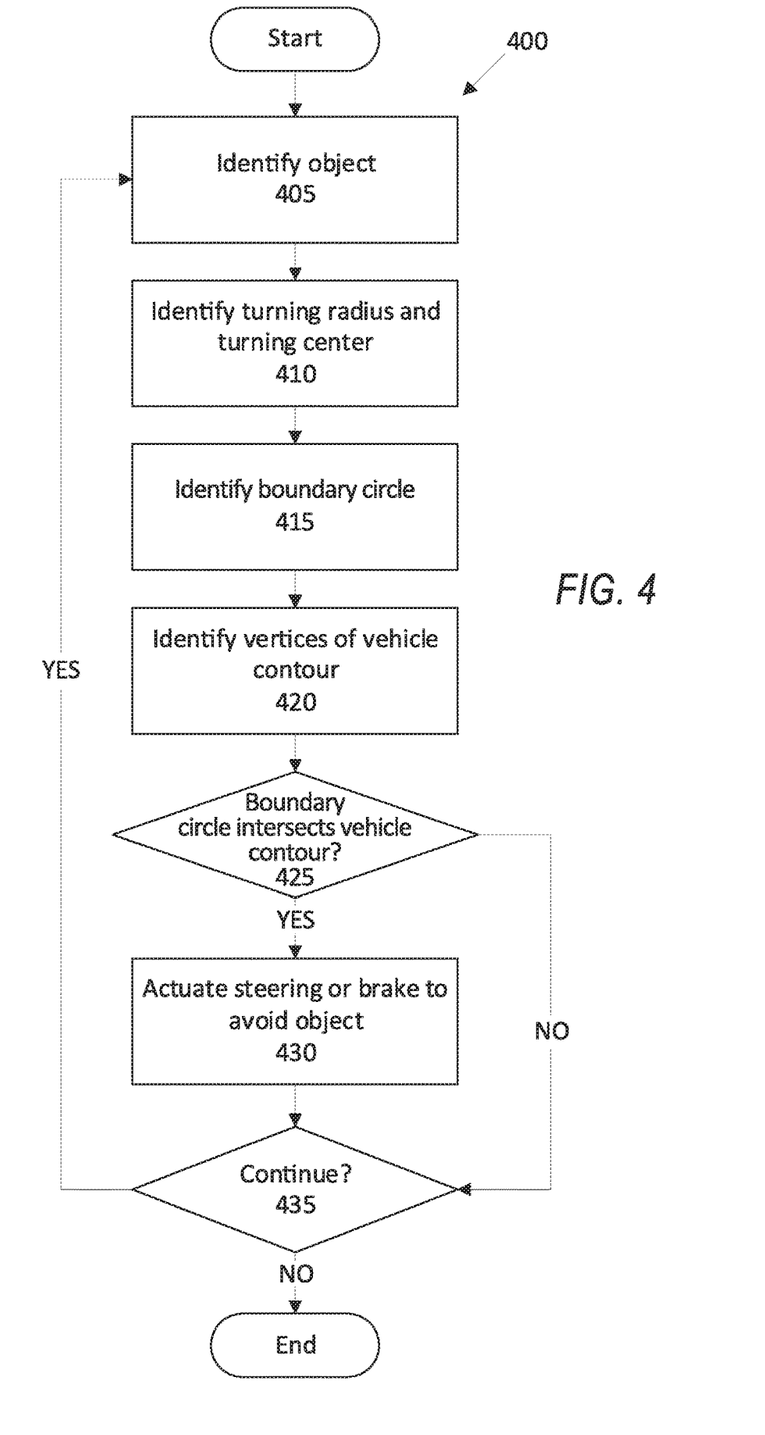
FIG. 4 is a diagram of a process for detecting the example object.

FIG. 4 is an example process 400 for avoiding an object 200. The process 400 begins in a block 405, in which a computer 105 in a vehicle 101 identifies an object 200. The computer 105 can actuate one or more sensors 110 to collect data 115 about the object 200. For example, the computer 105 can actuate a camera 110 to collect image data 115 and can identify the object 200 with a conventional image-processing algorithm, e.g., Canny edge detection.

Next, in a block 410, the computer 105 identifies a turning radius $r_v$ and a turning center c of the vehicle 101. As described above, when the vehicle 101 is in a turn, the trajectory of the vehicle 101 defines an arc of a circle having a radius $r_v$ and an origin at the turning center c. The computer 105 can identify the turning radius $r_v$ and the turning center c based on the road wheel angle δ, the heading angle φ, and/or a planned path of the vehicle 101.

Next, in a block 415, the computer 105 identifies a boundary circle 210. The boundary circle 210 is a circle having an origin at the turning center c and a radius extending to the position of the object 200. That is, the boundary circle 210 represents a circular path of the object 200 about the turning center c. When an external contour 205 of the vehicle 101 intersects the boundary circle 210, the computer 105 can determine that a collision with the object 200 is likely.

Next, in a block 420, the computer 105 identifies a plurality of vertices 300 and line segments 305 of the external contour 205. As described above, the external contour 205 can be a polygon defining a plurality of vertices 300 and line segments 305 connecting adjacent vertices 300. The vertices 300 and line segments 305 of the external contour 205 define a boundary of the vehicle 101 in the global coordinate system.

Next, in a block 425, the computer 105 determines whether the boundary circle 210 intersects the external contour 205. As described above, the computer 105 can determine whether the coordinates of the boundary circle 210 cross the coordinates of one or more line segments 305 of the external contour 205. If the boundary circle 210 intersects the external contour 205, the process 400 continues in a block 430. Otherwise, the process 400 continues in a block 435.

In the block 430, the computer 105 actuates one or more components 120, e.g., a steering component 120 or a brake 120, to avoid the object 200. For example, the computer 105 can identify a deceleration a and can actuate the brake 120 to slow the vehicle 101 until the object 200 passes the vehicle 101. In another example, the computer 105 can identify a road wheel angle δ to steer away from the object 200 and can actuate the steering component 120 (e.g., a steering motor) to avoid the object 200.

In the block 435, the computer 105 determines whether to continue the process 400. For example, the computer 105 can determine to continue the process 400 upon passing the object 200. If the computer 105 determines to continue, the process 400 returns to the block 405 to identify another object 200. Otherwise, the process 400 ends.

Figure 5:
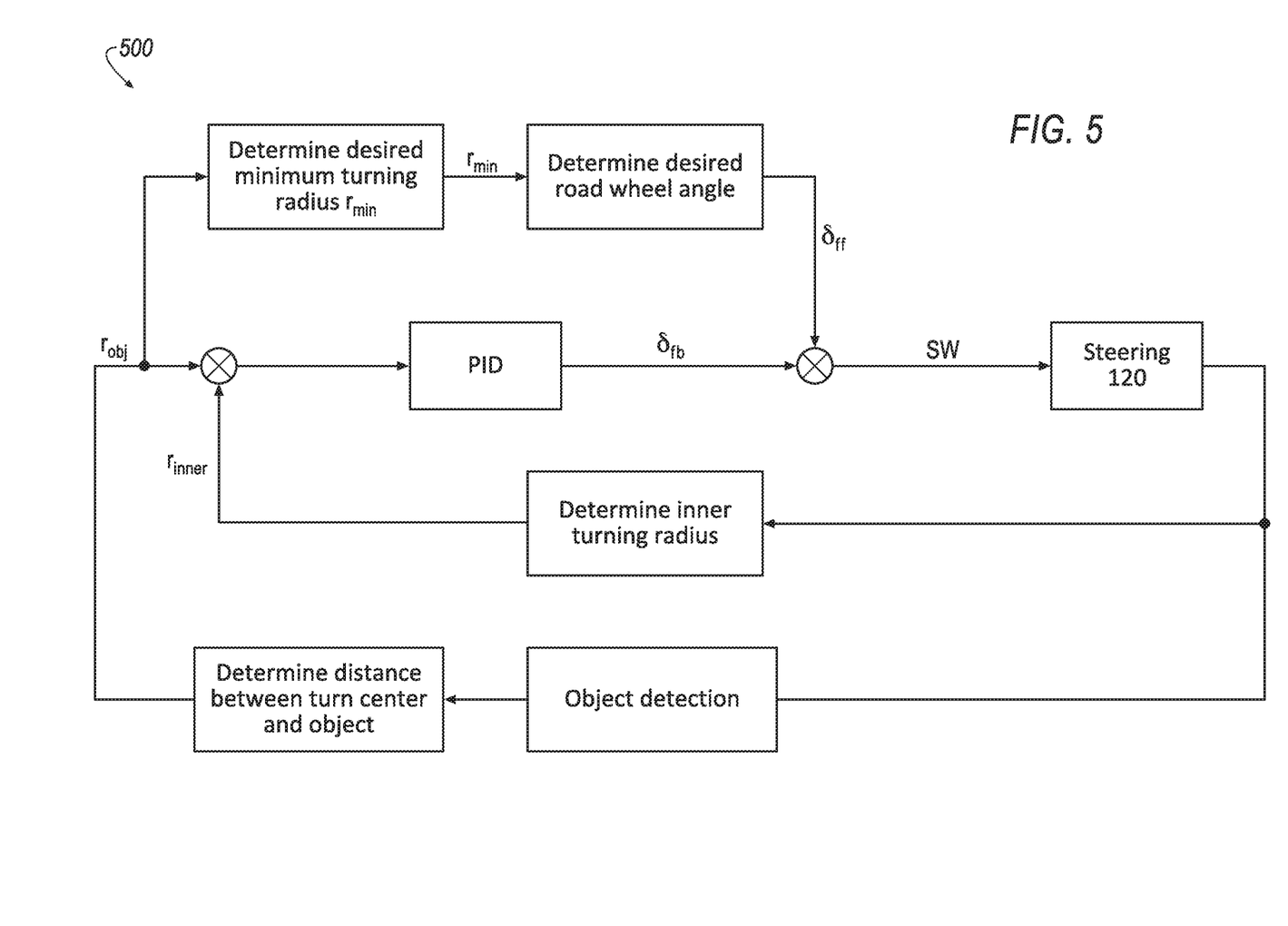
FIG. 5 is a diagram illustrating actuation of components of the example vehicle to avoid the example object.

FIG. 5 is a block diagram of an example control program 500 to identify a steering wheel angle SW to avoid the object 200. The computer 105 detects an object 200 and identifies the distance $r_{obj}$ between the turning center c and the object 200, as described above. The computer 105 identifies an inner turning radius $$r_{inner} = r_v - \frac{VW}{2}$$

representing the inner side of the vehicle 101. The vehicle 101 can avoid the object when the inner turning radius $r_{inner}$ exceeds the distance $r_{obj}$. The computer 105 can identify a steering wheel angle SW to increase the inner turning radius $r_{inner}$ to avoid the object 200. The computer 105 inputs the distance $r_{obj}$ and the inner turning radius $r_{inner}$ to a conventional control algorithm, e.g., Proportional Integral Derivative control, to identify a feedback road wheel angle $\delta_{fb}$. The feedback road wheel angle $\delta_{fb}$ is a road wheel angle that generates the inner turning radius $r_{inner}$, the turning center c, and the distance $r_{obj}$ to the object 200.

The computer 105 can identify the minimum turning radius as described above. Based on the minimum turning radius the computer 105 can identify a desired road wheel angle to achieve the minimum turning radius i.e., the feedforward road wheel angle $\delta_{ff}$. The computer 105 can determine the steering wheel angle SW as the sum of the feedback road wheel angle $\delta_{fb}$ and the feedforward road wheel angle $\delta_{ff}$. That is, the computer 105 can determine the desired steering wheel angle SW as:

$$SW = SR \cdot (\delta_{fb} + \delta_{ff}) \tag{18}$$

where SR is the steering ratio. The computer 105 can continue looping through the control program 500 until the object 200 is no longer likely to collide with the vehicle 101.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   identify a turning center for a vehicle defined by a turning radius of the vehicle and a heading angle of the vehicle;
   identify a boundary circle having a center defined by the turning center and a radius extending to a location of a detected object;
   identify coordinates for each of a plurality of vertices of an external contour of the vehicle, the external contour defining a plurality of line segments, each line segment connecting two of the vertices;
   determine whether the boundary circle intersects each line segment;
   upon identifying at least one line segment that intersects the boundary circle, identify at least one of an object distance or an intersection time between the object and the vehicle; and
   actuate at least one of a steering or a brake to avoid the object when the object distance is below a distance threshold or the intersection time is below a time threshold.

2. The system of claim 1, wherein the instructions further include instructions to identify an intersection point at a location where the boundary circle intersects one of the line segments and to determine the intersection time based on an angle between the location of the detected object and the intersection point.

3. The system of claim 1, wherein the instructions further include instructions to identify an intersection point at a location where the boundary circle intersects one of the line segments and to determine the object distance based on an angle between the location of the detected object and the intersection point.

4. The system of claim 1, wherein the instructions further include instructions to determine the intersection time based on a speed of the vehicle and the turning radius of the vehicle.

5. The system of claim 1, wherein the instructions further include instructions to identify an intersection point at a location where the boundary circle intersects one of the line segments and to determine an intersection heading angle of the vehicle at the intersection point.

6. The system of claim 5, wherein the instructions further include instructions to actuate the steering to steer away from the object based on the intersection heading angle.

7. The system of claim 1, wherein the instructions further include instructions to, upon actuating the steering to avoid the object, identify a new heading angle of the vehicle, to identify a new turning radius of the vehicle, and to identify a new turning center for the vehicle based on the new turning radius and the new heading angle.

8. The system of claim 1, wherein the instructions further include instructions to determine the turning radius of the vehicle based on one of a road wheel angle or a planned path of the vehicle.

9. The system of claim 1, wherein the instructions further include instructions to identify an intersection point at a location where the boundary circle intersects one of the line segments based on respective locations of the vertices between which the line segment extends.

10. The system of claim 1, wherein the external contour defines a polygon, and each of the plurality of vertices defines a vertex of the polygon.

11. The system of claim 1, wherein the instructions further include instructions to provide a warning to an occupant of the vehicle when the object distance is below a distance threshold or the intersection time is below a time threshold.

12. The system of claim 1, wherein the plurality of vertices includes at least five vertices.

13. A method, comprising:
   identifying a turning center for a vehicle defined by a turning radius of the vehicle and a heading angle of the vehicle;
   identifying a boundary circle having a center defined by the turning center and a radius extending to a location of a detected object;

identifying coordinates for each of a plurality of vertices of an external contour of the vehicle, the external contour defining a plurality of line segments, each line segment connecting two of the vertices;

determining whether the boundary circle intersects each line segment;

upon identifying at least one line segment that intersects the boundary circle, identifying at least one of an object distance or an intersection time between the object and the vehicle; and actuating at least one of a steering or a brake to avoid the object when the object distance is below a distance threshold or the intersection time is below a time threshold.

14. The method of claim 13, further comprising identifying an intersection point at a location where the boundary circle intersects one of the line segments and determining the intersection time based on an angle between the location of the detected object and the intersection point.

15. The method of claim 13, further comprising identifying an intersection point at a location where the boundary circle intersects one of the line segments and determining the object distance based on an angle between the location of the detected object and the intersection point.

16. The method of claim 13, further comprising identifying an intersection point at a location where the boundary circle intersects one of the line segments and determining an intersection heading angle of the vehicle at the intersection point.

17. A system, comprising:

a vehicle including a steering and a brake;

means for identifying a turning center for the vehicle defined by a turning radius of the vehicle and a heading angle of the vehicle;

means for identifying a boundary circle having a center defined by the turning center and a radius extending to a location of a detected object;

means for identifying coordinates for each of a plurality of vertices of an external contour of the vehicle, the external contour defining a plurality of line segments, each line segment connecting two of the vertices;

means for determining whether the boundary circle intersects each line segment;

means for identifying at least one of an object distance or an intersection time between the object and the vehicle upon identifying at least one line segment that intersects the boundary circle; and means for actuating at least one of the steering or the brake to avoid the object when the object distance is below a distance threshold or the intersection time is below a time threshold.

18. The system of claim 17, further comprising means for identifying an intersection point at a location where the boundary circle intersects one of the line segments and means for determining the intersection time based on an angle between the location of the detected object and the intersection point.

19. The system of claim 17, further comprising means for identifying an intersection point at a location where the boundary circle intersects one of the line segments and means for determining the object distance based on an angle between the location of the detected object and the intersection point.

20. The system of claim 17, further comprising means for identifying an intersection point at a location where the boundary circle intersects one of the line segments and means for determining an intersection heading angle of the vehicle at the intersection point.

* * * * *